US009026125B2

(12) United States Patent
Dhanda et al.

(10) Patent No.: US 9,026,125 B2

(45) Date of Patent: May 5, 2015

(54) SYSTEM AND METHODS FOR MITIGATING RECEIVER DESENSE CAUSED BY SIMULTANEOUS TRANSMISSION ON MULTI-SIM WIRELESS COMMUNICATIONS DEVICES

(71) Applicant: QUALCOMM Incorporated, San Diego, CA (US)

(72) Inventors: Mungal Dhanda, Slough (GB); Divaydeep Sikri, Woking (GB); William Stancer, Reading (GB); Simon Walke, Basingstoke (GB)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 13/743,329

(22) Filed: Jan. 16, 2013

(65) Prior Publication Data

US 2014/0199993 A1 Jul. 17, 2014

(51) Int. Cl.

| | |
|---|---|
| ***H04W 72/00*** | (2009.01) |
| ***H04W 24/02*** | (2009.01) |
| ***H04W 52/38*** | (2009.01) |
| ***H04B 1/00*** | (2006.01) |
| ***H04B 1/10*** | (2006.01) |
| ***H04W 88/08*** | (2009.01) |
| ***H04B 1/16*** | (2006.01) |

(Continued)

(52) U.S. Cl.

CPC .............. *H04W 24/02* (2013.01); *H04W 52/38* (2013.01); *H04B 1/005* (2013.01); *H04B 1/109* (2013.01); *H04B 1/3816* (2013.01); *H04B 1/525* (2013.01); *H04W 88/08* (2013.01); *H04B 1/1607* (2013.01); *H04B 1/3838* (2013.01); *H04W 52/0209* (2013.01); *H04W 52/04* (2013.01)

(58) Field of Classification Search

USPC ...................... 455/423–425, 418–420, 414.1, 455/435.1–435.2, 450, 552.1, 452.1, 452.2, 455/558, 451; 370/331, 338, 328, 423–425, 370/418–420, 414.1, 435.1–435.2, 450, 370/552.1

See application file for complete search history.

(56) References Cited

U.S. PATENT DOCUMENTS

| | | | | |
|---|---|---|---|---|
| 4,192,970 | A * | 3/1980 | Kahn | 381/15 |
| 6,677,736 | B1 | 1/2004 | Barnes et al. | |
| 7,035,346 | B1 | 4/2006 | Burke et al. | |

(Continued)

FOREIGN PATENT DOCUMENTS

| | | | |
|---|---|---|---|
| GB | 2492577 | A | 1/2013 |
| WO | 2009062188 | A1 | 5/2009 |

OTHER PUBLICATIONS

International Search Report and Written Opinion—PCT/US2014/011703—ISAEPO—Apr. 7, 2014.

*Primary Examiner* — Brandon Miller

(74) *Attorney, Agent, or Firm* — The Marbury Law Group, PLLC

(57) ABSTRACT

Methods are provided that enable mitigation of desense from a transmission on a first radio frequency (RF) resource associated with a first SIM to a receiver circuit of a second RF resource associated with a second SIM in the same device. A multi-SIM wireless device, such as a dual-SIM dual active (DSDA) device, may utilize characteristics of uplink and downlink signals to determine an optimal action that reduces interference from conflicting signals. Mitigating actions do not require involvement on the network side, and may greatly improve processing time for implementing interference prevention measures.

67 Claims, 9 Drawing Sheets

100
102
108
WIRELESS DATA NETWORK
Server 114
104
106
112
INTERNET
103
110
ROUTER

(51) Int. Cl.
*H04W 52/02* (2009.01)
*H04W 52/04* (2009.01)

(56) References Cited

U.S. PATENT DOCUMENTS 7,610,057 B2* 10/2009 Bahl et al. .................... 455/522
8,027,673 B2 9/2011 Rolf et al.
8,213,974 B2* 7/2012 Jarabek ........................ 455/512
2006/0067245 A1 3/2006 Pearl
2008/0062919 A1* 3/2008 Chen et al. .................... 370/329
2009/0181681 A1 7/2009 Hammond et al.
2009/0303975 A1* 12/2009 Xhafa et al. .................. 370/338
2010/0322287 A1 12/2010 Truong et al.
2011/0300805 A1 12/2011 Gaikwad et al.
2012/0027040 A1 2/2012 Hata et al.
2012/0069766 A1 3/2012 Fu et al.
2012/0082046 A1 4/2012 Ho et al.
2012/0120944 A1 5/2012 Yang et al.
2012/0176923 A1 7/2012 Hsu et al.
2012/0263047 A1 10/2012 Love et al.
2013/0012135 A1* 1/2013 Ruohonen et al. ........... 455/63.1
2014/0200046 A1 7/2014 Sikri et al.

* cited by examiner

600

602

604

| RECEIVE \ TRANSMIT | RACH | TCH | SACCH/ SDCCH | SACCH (TCH) | FACCH | PDCH | PACCH | RRBP |
|---|---|---|---|---|---|---|---|---|
| SCH PCH BCCH | Delay RACH | Cancel TCH | Handle SACCH/ SDCCH | Handle SACCH (TCH) | Delay FACCH | Cancel PDCH | Delay PACCH | Partial RRBP |
| TCH/ FACCH | Handle RACH | Priority to active SIM | Handle SACCH/ SDCCH | Handle SACCH (TCH) | Handle FACCH | Cancel PDCH | Partial PACCH | Partial RRBP |
| SACCH/ SDCCH | Delay RACH | Cancel TCH | Priority to active SIM | Priority to active SIM | Delay FACCH | Cancel PDCH | Delay PACCH | Partial RRBP |
| SACCH (TCH) | Delay RACH | Cancel TCH | Partial SACCH/ SDCCH | Priority to active SIM | Delay FACCH | Cancel PDCH | Partial PACCH | Partial RRBP |
| FCCH SCH IRAT | Delay RACH | Cancel TCH | Handle SACCH/ SDCCH | Handle SACCH (TCH) | Delay FACCH | Cancel PDCH | Partial PACCH | Partial RRBP |
| PDCH/ PACCH | Handle RACH | Handle TCH | Handle SACCH/ SDCCH | Handle SACCH (TCH) | Handle FACCH | Handle PDCH | Partial PACCH | Partial RRBP |
| T3192 running | Handle RACH | Handle TCH | Handle SACCH/ SDCCH | Handle SACCH (TCH) | Handle FACCH | Handle PDCH | Partial PACCH | Partial RRBP |
| FCCH/ SCH/ IRAT | Delay RACH | Cancel TCH | Handle SACCH/ SDCCH | Handle SACCH (TCH) | Delay FACCH | Cancel PDCH | Partial PACCH | Partial RRBP |
| Measure | Move monitor to non-clashing position | Move monitor to non-clashing position | Move monitor to non-clashing position | Move monitor to non-clashing position | Move monitor to non-clashing position | Move monitor to non-clashing position | Move monitor to non-clashing position | Move monitor to non-clashing position |

FIG. 6

SYSTEM AND METHODS FOR MITIGATING RECEIVER DESENSE CAUSED BY SIMULTANEOUS TRANSMISSION ON MULTI-SIM WIRELESS COMMUNICATIONS DEVICES

FIELD

The present invention relates generally to multi-SIM wireless communication devices, and more particularly to preventing receiver desensitization due to simultaneous communications in a multi-radio dual-SIM dual active (DSDA) wireless communication devices.

BACKGROUND

Receiver desensitization ("desense"), or degradation of receiver sensitivity, may result from noise interference from a nearby transmitter. In particular, when two radios are close together with one transmitting on the uplink and the other receiving on the downlink, the feedback from the transmitter may be picked by the receiver. As a result, the received signals may become corrupted and difficult or impossible to decode. Further, feedback from the transmitter can be detected by a power monitor that measures the receive signal, which would cause the mobile device to falsely determine the presence of a cell site. In particular, receiver desense may present a challenge in multi-radio devices, such as devices configured with multiple subscriber identity modules (SIMs), due to the necessary proximity of transmitter and receiver.

In general, mobile device radio receivers may have filters to reduce interference from a simultaneous transmit signal. In order to be effective, a transmit filter needs to be positioned in the radio circuitry after the signal is amplified, but that requires a filter that can handle high power levels, and such filters are expensive. Consequently, protocols for mobile communication systems are designed to mitigate desense without the need to use a filter in the transmitter, such as by avoiding simultaneous transmit and receives (such as UTRAN TDD, E-UTRAN TDD), by sufficiently separating the frequency domain between transmit and receive signals (such as GSM, UTRAN FDD, E-UTRAN FDD), etc.).

Dual-SIM mobile devices have become increasing popular because of their flexibility in service options and other features. One type of dual-SIM mobile device, a dual-SIM dual active (DSDA) device, allows simultaneous active connections with the networks corresponding to both SIMs. DSDA devices typically have separate transmit/receive chains associated with each SIM. As such, previous communication system designs are inadequate to prevent desense in devices that have two or more of these radio access technologies operating within the same device at the same time, such as in DSDA mobile devices.

SUMMARY

Systems, methods, and devices of the various embodiments enable a multi-radio device to perform actions to mitigate predicted desense interference to a receiver on the device from a transmitter on the device. In an embodiment, mitigating desense to a receiver in a multi-SIM wireless device may include: detecting potential interference between a scheduled transmission on a first SIM and a receive activity on a second SIM, in which the first SIM is associated with a first radio frequency (RF) resource and the second SIM is associated with a second RF resource. When an interference is detected, a level of potential interference between the scheduled transmission and the receive activity may be calculated and, and a level of desense to the receiver based on the calculated potential interference may be predicted. Based on this, a determination may be made as to whether the predicted desense level exceeds a predetermined threshold. If it does, a mitigating action may be selected, and performed on the multi-SIM device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 6 is a data structure diagram illustrating example predetermined desense mitigating actions that may be taken at the wireless device.

DETAILED DESCRIPTION

Figure 1:
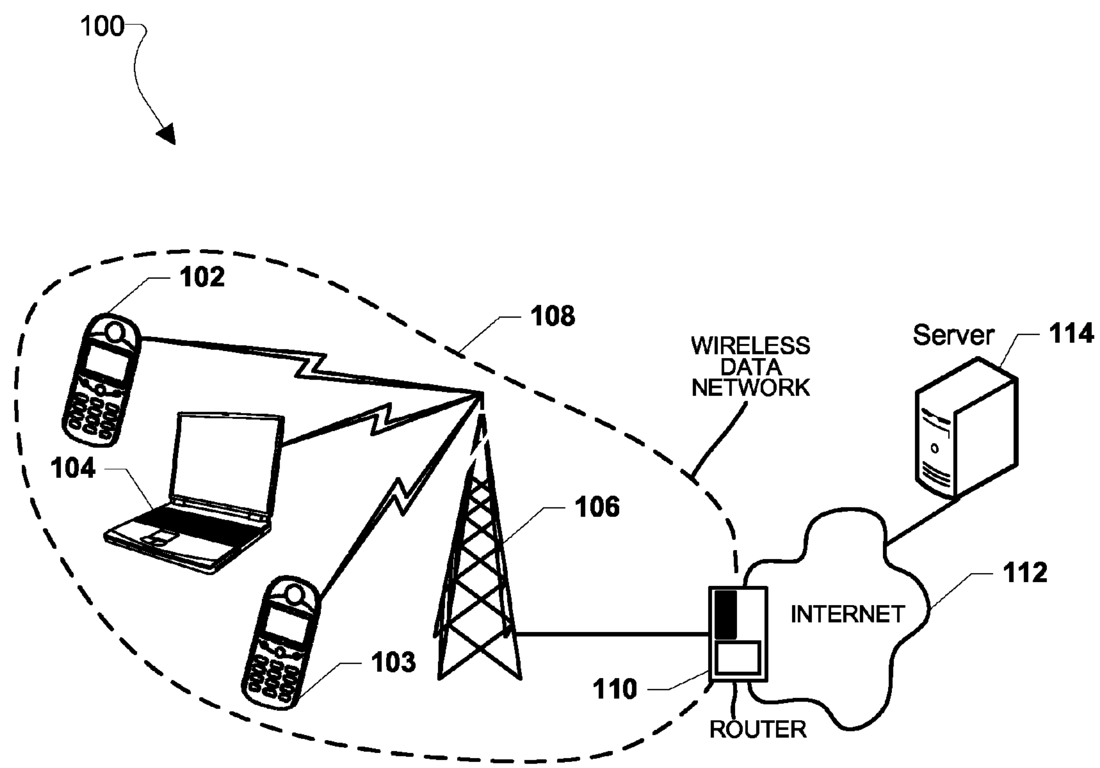
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," "wireless communications device," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM", "SIM card" and "subscriber identification module" are used interchangeably to mean an integrated circuit, embedded into a removable card, that stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network correlate to one another.

As used herein, the terms "multi-SIM device," "multi-SIM wireless device" "dual-SIM device" "dual-SIM dual active device" and "DSDA device" are used interchangeably to describe a wireless device that is configured with more than one SIM and is capable of independently handling communications with networks of both subscriptions.

As used herein, the terms "conflict" and "conflicting" refer to situations in which noise interference from a transmitter is causing or may cause signal interference at a receiver.

In a radio frequency communications system, such as a cellular network, noise interference with a receiver may be caused by a transmitter. The transmitter radiates energy at frequencies above and below its operating frequency (i.e., sideband) in addition to at its operating frequency. This band spread may fall within the passband of a nearby or co-located receiver even if the receiver's operating frequency is several megahertz (MHz) away. Thus, the transmitter noise may appear as an "on-channel" signal at receiver, and is not filtered out at the receiver. Receiver desense is caused by this transmitter noise competing with the desired signal, which in effect, degrades the operational performance of the receiver. This is particularly a problem when the transmitter and receiver are in the same device, such as a mobile device.

The various embodiments provide systems and methods for mitigating predicted desense to a receiver from a transmitter of another radio within the same device. In the various embodiments, predicted desense may be the result of the transmitter and receiver operating on adjacent or overlapping frequency bands. The various embodiments allow a wireless device to take action autonomously in order to mitigate desense to the receiver. The embodiment methods provide ways to mitigate interference between signals on different transmit/receive chains associated with different respective SIMs. In particular, a wireless device may take independent action, without network involvement, to mitigate receiver desense. That is, instead of requiring network-side action (e.g., moving a signal to a different frequency or timeslot), the embodiment methods allow resolution of the problem at the mobile device as soon as an interference situation is recognized or predicted. Further, in the embodiment methods, a wireless device may correct predicted interference between transmit and receive messages based on characteristics of the logical channels mapped onto the interfering physical channels.

FIG. 1 illustrates a wireless network system 100 suitable for use with the various embodiments. Wireless communications devices 102, 103, and 104 and a wireless transmitter/receiver 106 together make up a wireless data network 108. Using the wireless data network 108, data may be transmitted wirelessly between the wireless devices 102, 103, and 104 and the wireless cell tower or base station 106. The transmissions between the wireless devices 102, 103, and 104 and the wireless cell tower or base station 106 may be by any cellular networks, including Wi-Fi, CDMA, TDMA, GSM, PCS, G-3, G-4, LTE, or any other type connection. The wireless network 108 may be in communication with a router 110 which connects to the Internet 112. In this manner data may be transmitted from/to the wireless devices 102, 103, and 104 via the wireless network 108, and router 110 over the Internet 112 to/from a server 114 by methods well known in the art. While the various embodiments are particularly useful with wireless networks, the embodiments are not limited to wireless networks and may also be implemented over wired networks with no changes to the methods.

Some or all of the wireless devices 102 may be configured with multi-mode capabilities and may include multiple transceivers for communicating with different wireless networks over different wireless links/radio access technologies (RATs). For example, a wireless device 102 may be configured to communicate over multiple wireless data networks on different subscriptions, such as in a dual-SIM wireless device. In particular, a wireless device 102 may be configured with dual-SIM dual active (DSDA) capability, which enables a dual-SIM device to simultaneously participate in two independent communications sessions, generally through independent transmit/receive chains.

For clarity, while the techniques and embodiments described herein relate to a wireless device configured with multiple GSM subscriptions, they may be extended to subscriptions on other radio access networks (e.g., UMTS, WCDMA, LTE, etc.).

The GSM standard employs a multiple access scheme that defines how simultaneous communication can occur between different wireless devices and base stations. Within each cell, a combination of frequency division multiple access (FDMA) and time division multiple access (TDMA) techniques are employed by the standard. Specifically, each 25 MHz band is divided into 124 carrier frequencies spaced at 200 kHz intervals, and each carrier frequency divided into eight time slots, each lasting approximately 0.577 ms. The eight time slots for each carrier may be considered a single TDMA "frame", lasting approximately 4.615 ms; which may be employed by a wireless device. In this manner individual physical channels may be formed, each of which correspond to a particular carrier frequency and time slot number.

The logical channels that are mapped to the physical channels are categorized by the information that is carried within the physical channels. Specifically, the Traffic Channels (TCH) carry speech or user data in a circuit switched or packet switched network, and may be half-rate or full-rate. Control channels carry signaling or synchronization data in a circuit switched or packet switched network, and may be further categorized as broadcast control channels (BCH), common control channels (CCCH), and dedicated control channels.

Figure 2:
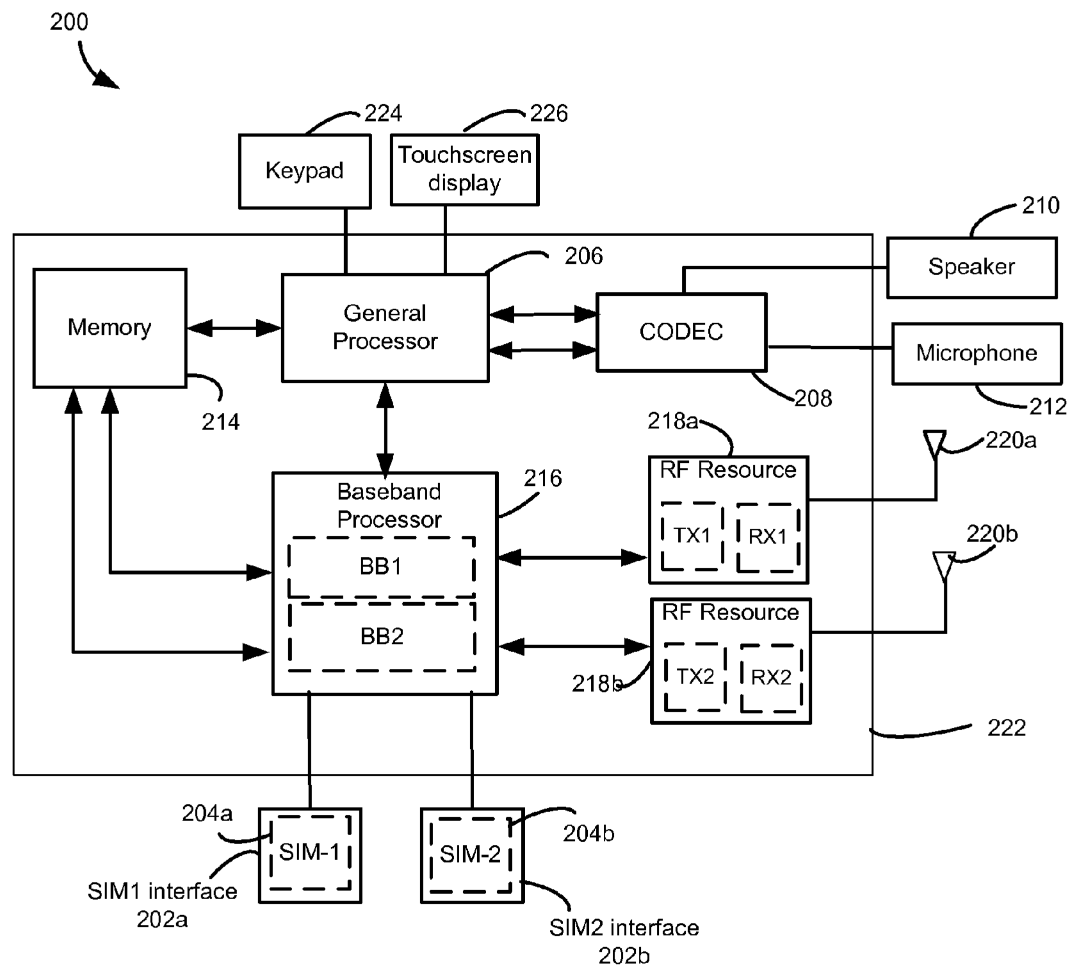
FIG. 2 is a block diagram illustrating a dual-SIM dual active wireless communications device according to an embodiment.

FIG. 2 is a functional block diagram of a multi-SIM wireless device 200 that is suitable for implementing the various embodiments. Wireless device 200 may include a first SIM interface 202*a*, which may receive a first identity module SIM-1 204*a* that is associated with the first subscription. The wireless device 200 may also include a second SIM interface 202*b*, which may receive a second identity module SIM-2 204*b* that is associated with the second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM card may further store a Home Public-Land-Mobile-Network (HPLMN) code to indicate the SIM card network operator provider. An Integrated Circuit Card Identity (ICCID) SIM serial number is printed on the SIM card for identification.

Wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband—RF resource chain.

The memory 214 may store operating system (OS), as well as user application software and executable instructions. The memory 214 may also store application data, such as an array data structure, may be used to store predetermined or prefetched elements in a look-up table/desense mitigation matrix, an example of which is described in detail below with reference to FIGS. 5 and 6.

The general processor 206 and memory 214 may each be coupled to at least one baseband modem processor 216. Each SIM in the wireless device 200 (e.g., SIM-1 202*a* and SIM-2 202*b*) may be associated with a baseband-RF resource chain. Each baseband-RF resource chain may include baseband modem processor 216 to perform baseband/modem functions for communications on a SIM, and one or more amplifiers and radios, referred to generally herein as RF resources 218. In one embodiment, baseband-RF resource chains may share a common baseband modem processor 216 (i.e., a single device that performs baseband/modem functions for all SIMs on the wireless device). Alternatively, each baseband-RF resource chain may include physically or logically separate baseband processors (e.g., BB1, BB2).

RF resources 218*a*, 218*b* may each be transceivers that perform transmit/receive functions for the associated SIM of the wireless device. RF resources 218*a*, 218*b* may include separate transmit and receive circuitry, or may include a transceiver that combines transmitter and receiver functions. The RF resources 218*a*, 218*b* may be coupled to a wireless antenna (e.g., a first wireless antenna 220*a* and a second wireless antenna 220*b*). The at least one memory 214 of the wireless device 200 may store an operating system (OS) and user application software.

In a particular embodiment, the general processor 206, memory 214, baseband processor(s) 216, and RF resources 218*a*, 218*b* may be included in a system-on-chip device 222. The first and second SIMs 202*a*, 202*b* and their corresponding interfaces 204*a*, 204*b* may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

Figure 3:
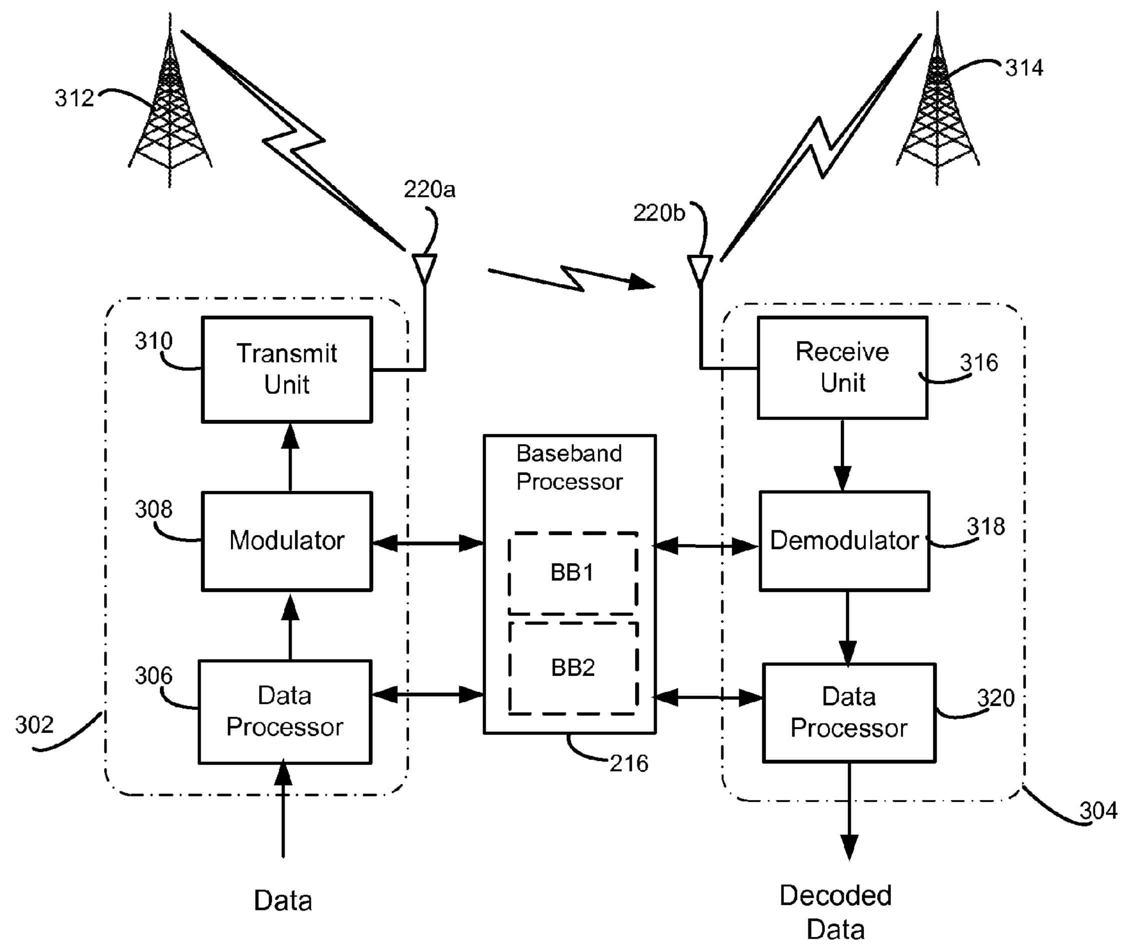
FIG. 3 is a block diagram illustrating the interaction between components of different transmit/receive chains in a dual-SIM dual active wireless communications device according to an embodiment.

FIG. 3 illustrates a block diagram of transmit and receive components in separate RF resources. For example, a transmitter 302 may be part of one RF resource 218*a*, and a receiver 304 may be part of another RF resource 218*b*, as described above with reference to FIG. 2. In a particular embodiment, the transmitter 302 may include a data processor 306 that may format, encode, and interleave data to be transmitted. The transmitter 302 may include a modulator 308 that modulates a carrier signal with encoded data, for example, by performing Gaussian minimum shift keying (GMSK). One or more transmit circuits 310 may condition the modulated signal (e.g., by filtering, amplifying, and upconverting) to generate a RF modulated signal for transmission. The RF modulated signal may be transmitted, for example, to a base station 312 via an antenna, such as antenna 220*a* as shown in FIG. 2.

At the receiver 304, an antenna 220*b* may receive RF modulated signals from a base station 314 for example. However, the antenna 220*b* may also receive some RF signaling from the transmitter 302, which ultimately competes with the desired signal from the base station 314. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the wireless device. Operations of the transmitter and the receiver may be controlled by a processor, such as a baseband processor(s) 206 as illustrated in FIG. 2. In the various embodiments, each of the transmitter 302 and receiver 304 may be implemented as circuitry that is separated from their corresponding receive and transmit circuitries (not shown). Alternatively, the transmitter 302 and the receiver 304 may be respectively combined with corresponding receive circuitry and transmit circuitry (i.e., as transceivers associated with SIM-1 and SIM-2).

As discussed above, receiver desense may occur when data associated with a first SIM transmitted on the uplink interferes with receive activity on a different transmit/receive chain that is associated with a second SIM. The desired signals may become corrupted and difficult or impossible to decode. Further, noise from the transmitter may be detected by a power monitor that measures the signal strength of surrounding cells, which may cause the mobile device to falsely determine the presence of a nearby cell site. While example embodiments are discussed in terms of interference between transmit and receive data associated with two SIMs, additional SIMs and network connections may be enabled in a multi-SIM wireless device.

In an embodiment, upon predicting that receiver desense may occur due to interference from transmit signals associated with another SIM in a multi-SIM device, the wireless device may implement an algorithm to select an optimal desense mitigating action. Mitigating actions may include, but are not limited to: reducing power of the transmit signal; transmitting only a part of the interfering data on the uplink, delaying transmission on the uplink, handling the transmission normally, and cancelling the interfering data on the uplink. By tailoring the mitigating action to various properties of the transmit and receive signals (e.g., channel characteristics, priority, etc.), the wireless device may maximize reduction in interference while minimizing possible degradation of service. The mitigating actions may be taken as soon as interference is predicted, without waiting for response from the network.

Some mitigating actions at the wireless device may involve changes to a scheduled transmission. For example, while data to be sent on the uplink may normally be scheduled and handled by the wireless device, when such data transmissions will conflict (i.e., will interfere) with certain scheduled receive bursts (e.g., call setup), priority may be allocated to the downlink signal and the wireless device may avoid conflicting transmission on the uplink (e.g., by delaying, cancelling or otherwise adjusting the scheduled transmission).

Figure 4A:
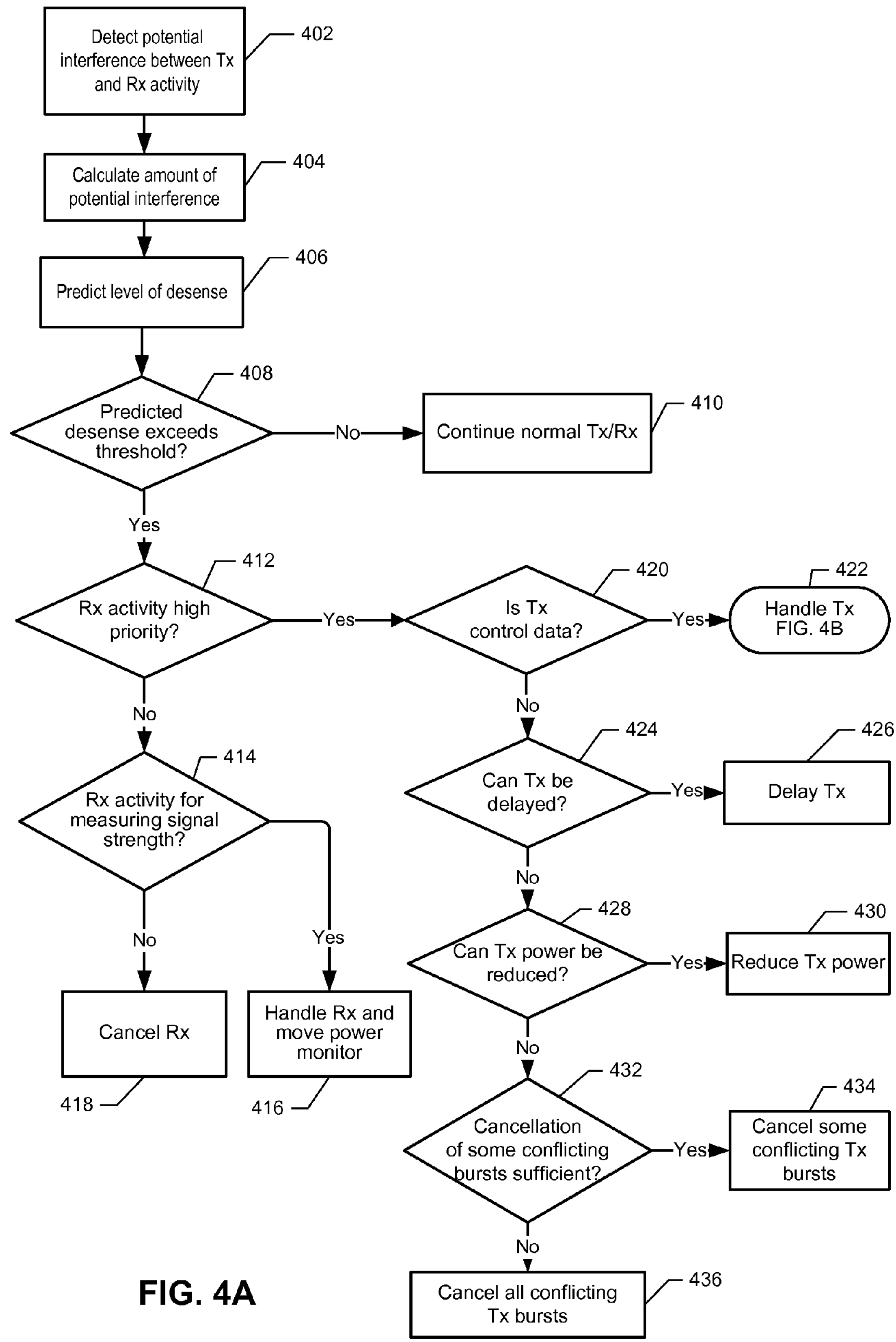
FIGS. 4A and 4B are process flow diagrams illustrating an embodiment method for mitigating desense interference to a receiver in a dual-SIM dual active device.

In an embodiment, a wireless device may make an ad hoc selection of a desense mitigation action by implementing a desense mitigation algorithm/process. In an embodiment illustrated in FIG. 4A, a multi-SIM wireless device may employ method 400 to avoid or reduce conflicts between a scheduled transmission on the first SIM and a receive activity on the second SIM. The operations of method 400 may be implemented by one or more processors of the wireless device, such as the general processor 206 shown in FIG. 2, or a separate controller (not shown) that may be coupled to memory and to the baseband modem processor(s) 216.

In block 402 of method 400, a processor of the wireless device may detect potential interference from a scheduled transmission and to the receive activity. For example, the wireless device may detect parameter values for the communications associated with each SIM, such as transmit and/or receive frequency, transmit and/or receive power, or a combination thereof. In an embodiment, transmit/receive power may be measured using one or more of a variety of RF signal analyzers and/or meters, which may be included as components in the wireless device, and may output measurements to a processor. In block 404, the processor may calculate the amount of potential interference to the receive activity using the detected transmit/receive parameter values. For example, a lookup table or formula may be stored on a memory of the wireless device, which may be accessed by the processor and applied to the detected transmit/receive parameter values. In block 406, the processor may predict a level of desense to the receiver associated with the second SIM based on the calculated amount of potential interference to the receive activity. In determination block 408, the processor may determine whether to employ processes to mitigate receiver desense by determining whether the predicted level of desense exceeds a predetermined threshold. If the predicted desense is not greater than the predetermined threshold (i.e., determination block 408="No"), the processor may accept the potential receiver desense and handle the scheduled transmission per normal in block 410. If the predicted desense exceeds the determined threshold (i.e., determination block 408="Yes"), in determination block 412 the processor may determine whether the receive activity is a high priority signal. This determination may be based solely on the importance of the receive signal, or may be based on relative priority and exploitable characteristics between the conflicting transmit and receive bursts.

For example, a receive signal that is not generally treated with priority may be designated as higher priority than speech data sent on the traffic channel (TCH). That is, cancellation of encoded speech data bursts may have an insignificant effect on the transmission, since the receiving party's device may insert comfort noise that makes small gaps undetectable to the listener. Accordingly, since bursts on the TCH may ultimately be cancelled if necessary, other signals without such flexibility may receive "high priority" status over TCH data to be sent on the uplink.

If the receive signal for which interference is predicted is not a high priority signal (i.e., determination block 412="No"), the wireless device processor may determine whether the receive activity constitutes monitoring signal strength of surrounding cells on the second SIM in determination block 414. If the receive activity constitutes monitoring the signal strength of surrounding cells (i.e., determination block 414="Yes"), the processor may move the receive signal to a different time slot in the TDMA frame or to a different TDMA frame in block 416, and handle the receive activity. If the predicted interference is not to a signal from power monitor for the receiver associated with the second SIM (i.e., determination block 414="No"), the wireless device processor may cancel the receive activity in block 418.

If the processor determines that the receive activity is a high priority signal (i.e., determination block 412="Yes"), the wireless device processor may determine whether the conflicting data is scheduled to be sent on the uplink control channel in determination block 420. If the conflicting data is scheduled to be sent on the uplink control channel (i.e., determination block 420="Yes"), in block 422 the wireless device processor may perform a separate process to handle the uplink control channel bursts as described below with reference to FIG. 4B.

If the conflicting data is not scheduled to be sent on the uplink control channel (i.e., determination block 420="No"), in determination block 424 the wireless device may determine whether the scheduled transmission may be delayed to avoid potential interference. Such determination may exploit the characteristic of some channels on which delay does not negatively impact service. If the transmit signal may be delayed to avoid interference (i.e., determination block 424="Yes"), the scheduled transmission may be delayed until a receive activity has been completed or until there is a known gap in scheduled receive activity, block 426. If the scheduled transmission may not be delayed to avoid interference (i.e., determination block 424="No"), the wireless device processor may determine whether reducing power for the transmitter associated with the first SIM may sufficiently reduce predicted interference to the receive activity without causing the scheduled transmission to fail, in determination block 428. If reducing transmit power may sufficiently reduce the predicted interference without causing the scheduled transmission to fail (i.e., determination block 428="Yes"), in block 430 the wireless device processor may reduce the transmit signal associated with the first SIM. If reducing transmit power would not sufficiently reduce the predicted interference while satisfying the requirements for successful transmission (i.e., determination block 428="No"), in determination block 432 the wireless device processor may determine whether cancelling some of the conflicting bursts in the scheduled transmission frame (i.e., a partial transmit) may sufficiently reduce the predicted interference to the receive signal. For example, a partial transmit may exploit redundancies built into encoding for certain control signals.

If cancelling some of the conflicting bursts in the scheduled transmission frame may sufficiently reduce the predicted interference (i.e., determination block 432="Yes"), the wireless device may partially transmit the frame on the uplink in block 434. If cancelling some of the conflicting bursts would not sufficiently reduce the predicted interference (i.e., determination block 432="No"), the wireless device processor may cancel the scheduled transmission frame in block 436.

Thus, by tailoring the mitigating action to the particular combination of transmission and receive activity, the wireless device processor may maximize reduction in interference while minimizing possible degradation of service.

An example use case for method 400 after determining that the predicted desense level exceeds the predetermined threshold (i.e., determination block 408="Yes"), a scheduled transmission may be a burst to be sent on the RACH, and the receive activity may be a message on the broadcast control channel (BCCH). The wireless device processor may determine that the BCCH should be allocated high priority (or higher priority than the signal on RACH) in determination block 412. The wireless device processor may determine that the transmission is not scheduled to be sent on the control channel in determination block 420.

Figure 4B:
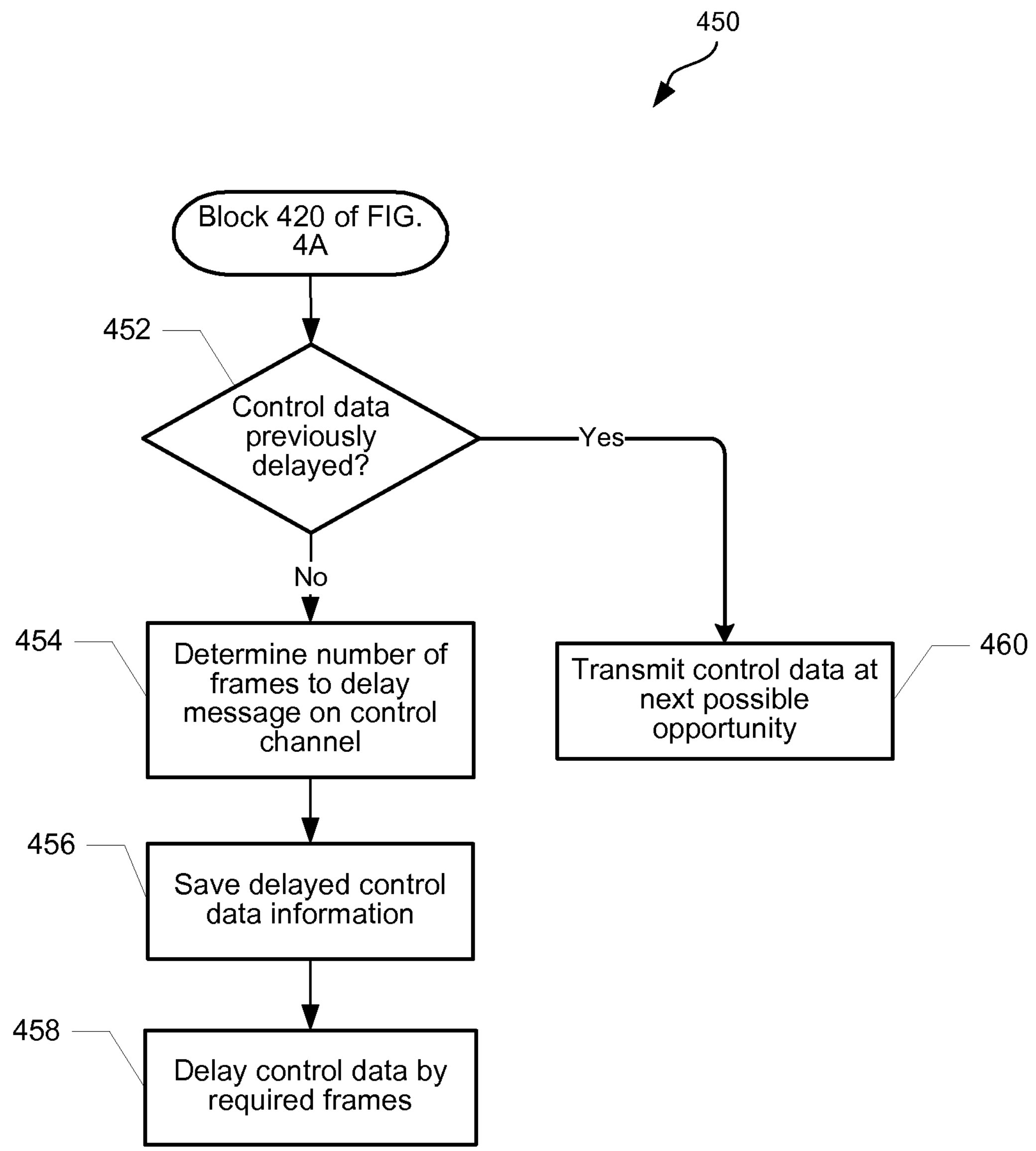

FIG. 4B illustrates an embodiment method for handling a scheduled transmission that is to be sent on the control channel (i.e., determination block 420="Yes). Specifically, while a message over the control channel may be delayed, the wireless device processor may be configured to delay the control channel only once, so as to avoid negative impact on the upper layers of the protocol stack. In method 450, the wireless device processor may determine whether the scheduled transmission has previously been delayed in determination block 452. For example, the wireless device processor may access an area of application storage or RAM to make this determination. If the scheduled transmission has not been previously delayed (i.e., determination block 452="No"), the wireless device processor may determine a number of frames by which to delay the control channel transmission in order to avoid the potential interference to the receive activity, in block 454. In block 456, the wireless device processor may save the delay information, for example, in application storage or in RAM, making the delay information accessible to a subsequent cycle of method 450. In block 458, the wireless device processor may delay the transmission on the control channel by the determined number of frames.

If the scheduled transmission has been previously delayed (i.e., determination block 452="Yes"), the wireless device processor may transmit the delayed message on the control channel at the next available opportunity, in block 460.

In another embodiment, a large number of the steps involved in selecting a desense mitigating action on the wireless device processor may be performed in advance. That is, instead of relying on ad hoc selection as discussed above with reference to FIG. 4A, results of a selection process (e.g., the algorithm in method 400 of FIG. 4A) for the various combinations of scheduled transmissions and receive activities may be predetermined and stored in a desense mitigation matrix/look-up table. Since many properties of the uplink and downlink signals may be known in advance and stored on the wireless device processor, in this embodiment the wireless device processor is not required to perform the steps of the desense mitigation algorithm (e.g., method 450) for each conflict scenario, as it occurs. In this manner, a result may be developed for most or all interference scenarios for the transmit and receive signal-types. In a particular embodiment, a desense matrix may indicate one of the possible mitigating actions that are discussed above with reference to FIG. 4A. Thus, by tailoring the mitigating action to the particular combination of transmission and reception activity, the wireless device may maximize reduction in interference (i.e., minimize interference) while minimizing the possible degradation of service.

Figure 5:
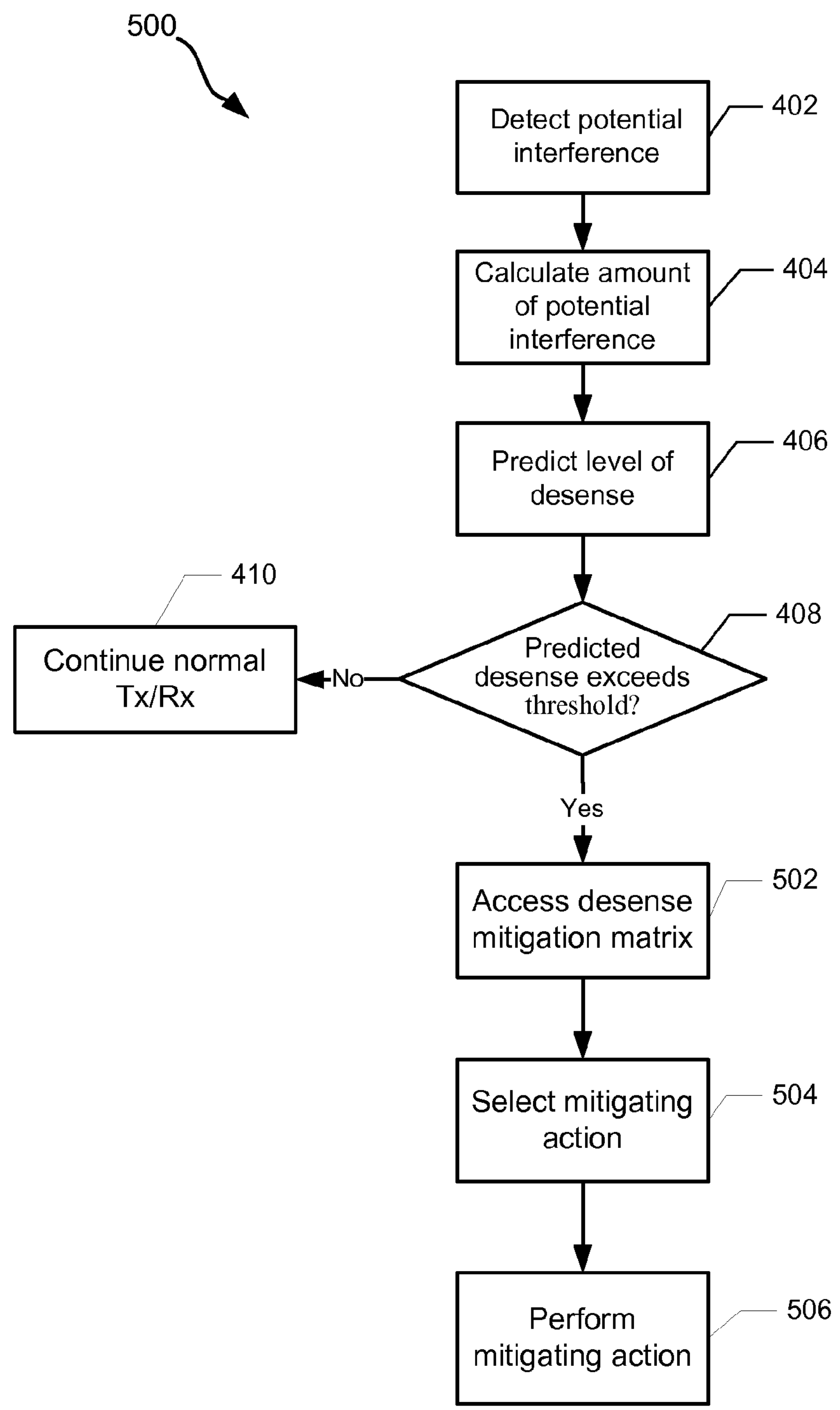
FIG. 5 is a process flow diagram illustrating an alternative embodiment method for mitigating desense interference to a receiver in a dual-SIM dual active device

FIG. 5 illustrates an embodiment method of selecting an optimal mitigation action using a desense mitigation matrix. Method 500 may begin with the operations in blocks 402-408 of FIG. 4A. In block 502, the wireless device processor may perform a table look-up process on an array, matrix or other data structure that contains or is linked to desense mitigation actions or information. In block 502, the wireless device processor may use the characteristic of the scheduled transmission as a first look-up index or parameter and the characteristic of the receive activity as a second look-up index or parameter to locate a memory address in which is stored the corresponding mitigating action. In block 504, the wireless device processor may use the matrix to select an optimum desense mitigation action based on characteristics of the scheduled transmission (e.g., logical channel, etc.) In block 506, the wireless device processor may implement the selected mitigation action on the wireless device processor. Thus, similar to FIG. 4A, the mitigating action may be tailored a particular combination of transmission and receive activity.

FIG. 6 illustrates an example desense matrix shown in table 600. Table 600 may be stored in memory on a wireless device and accessed by a processor, such as the general processor 206 shown in FIG. 2 above. The various channels for the scheduled transmission that may be used for look-up criteria are illustrated as headers 602 of the table columns and the receive channels for scheduled receive activity that may be used for look-up criteria for are listed as headers 604 of the table rows. Mitigating actions (e.g., an XML script or command list) appropriate for each combination of scheduled transmission and receive activity may be stored in memory with an address that corresponds to the characteristic of the scheduled transmission and receive activity. In other words, the scheduled transmission and receive activity characteristics may be used as look-up indices or parameters to locate the address in memory at which is stored the corresponding mitigating action.

The channels that are listed in the column and row headers in FIG. 6 are abbreviations that are defined in 3GPP TR 21.905 version 11.2.0 Release 11. Uplink control channels that may be provided as possible carriers of the scheduled transmission may include, but are not limited to: Random Access Control Channel (RACH); Traffic Channel (TCH), Slow Associated Control Channel (SACCH) that is associated with bursts on Slow Dedicated Control Channel (SDCCH); SACCH associated with TCH; Fast Associated Control Channel (FACCH); Packet Data Channel (PDCH); and Packet Associated Control Channel (PACCH).

A PACCH channel carries RLC/MAC control messages. A block for transmitting a PACCH message may be reserved for a wireless device by a packet switched network using a Reserved Radio Block Period (RRBP), shown in the last column of table 600.

Downlink channels that may be provided as possible receive activities may include, but are not limited to: Synchronisation Channel (SCH); Paging Channel (PCH); Broadcast Control Channel (BCCH); TCH (which also may contain FACCH); SACCH associated with the TCH; SACCH associated with the SDCCH, Frequency Correction Channel (FCCH); Packet Dedicated Channel (PDCH); and Packet Associated Control Channel (PACCH). Another possible receive activity, shown in the bottom row 604 in table 600, may include receiving signals from a monitor that measures signal strength in nearby cells. For example, a receive activity may include measurements of signal strength for a nearby GSM cell. In another embodiment, a receive activity may include measurements of signal strength for cells that use other technology, called (i.e., InterRAT measurement ("IRAT")). Another possible receive activity, illustrated in the third row 604 from the bottom of table 600, may include a message for a T3192 timer that may be running until receiving a message to force release of the PDCH.

Example mitigating actions are shown in the FIG. 6 desense mitigation matrix for the various signal interferences. Again, for each combination of a scheduled transmission channel and receive activity, a predefined mitigating action may be stored in memory at an address that can be identified using the matrix and the transmission characteristics (column) and receive activity characteristics (row) as look-up criteria.

The characteristics and details that define the mapping of these logical channels are discussed in detail in GSM specifications, in particular 3GPP TS 45.002. 3GPP TS 45.002 version 11.0.0 Release 11.

The desense mitigation matrix 600 may be stored on the wireless device in an array data structure. In the various embodiments, a mitigating action for potential interference from a transmission to a receive activity based on properties thereof may be retrieved for a combination of transmit signal channels and receive signal channels as needed to reduce predicted interference. Data values relating to other characteristics of the transmit and receive signals may be stored along with the desense mitigation matrix data in order to optimize selection of a mitigating action (for example, signal strength, QoS, etc.) For the same use case discussed above with reference to FIG. 4A (i.e., a transmission to be sent on the RACH and a receive burst on the BCCH), the wireless device processor may simply access the corresponding information in the stored matrix, shown as an instruction to delay the RACH.

Figure 7:
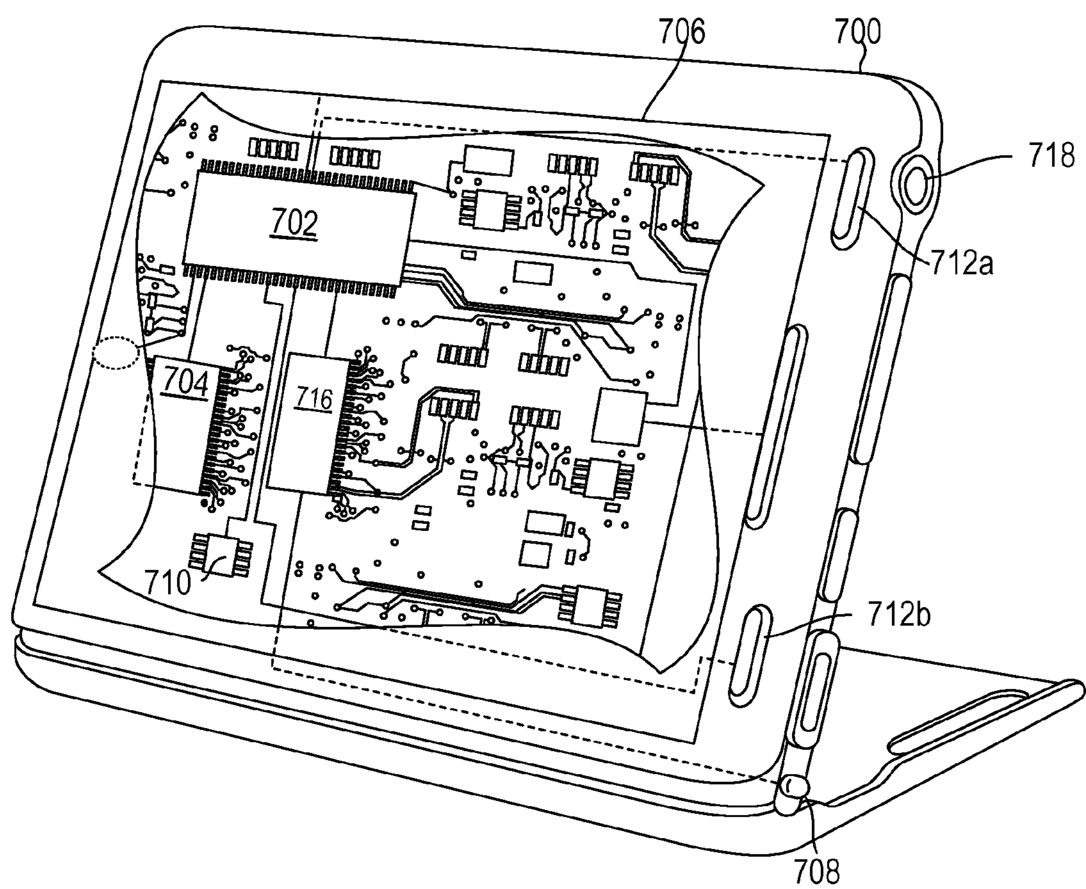
FIG. 7 is a component diagram of an example mobile device suitable for use with the various embodiments.

The various embodiments may be implemented in any of a variety of mobile devices, an example of which is illustrated in FIG. 7. For example, the mobile device 700 may include a processor 702 coupled to internal memories 704 and 710. Internal memories 704 and 710 may be volatile or non-volatile memories, and may also be secure and/or encrypted memories, or unsecure and/or unencrypted memories, or any combination thereof. The processor 702 may also be coupled to a touch screen display 706, such as a resistive-sensing touch screen, capacitive-sensing touch screen infrared sensing touch screen, or the like. Additionally, the display of the mobile device 700 need not have touch screen capability. Additionally, the mobile device 700 may have one or more antenna 708 for sending and receiving electromagnetic radiation that may be connected to a wireless data link and/or cellular telephone transceiver 716 coupled to the processor 702. The mobile device 700 may also include physical buttons 712*a* and 712*b* for receiving user inputs. The mobile device 700 may also include a power button 718 for turning the mobile device 700 on and off.

Figure 8:
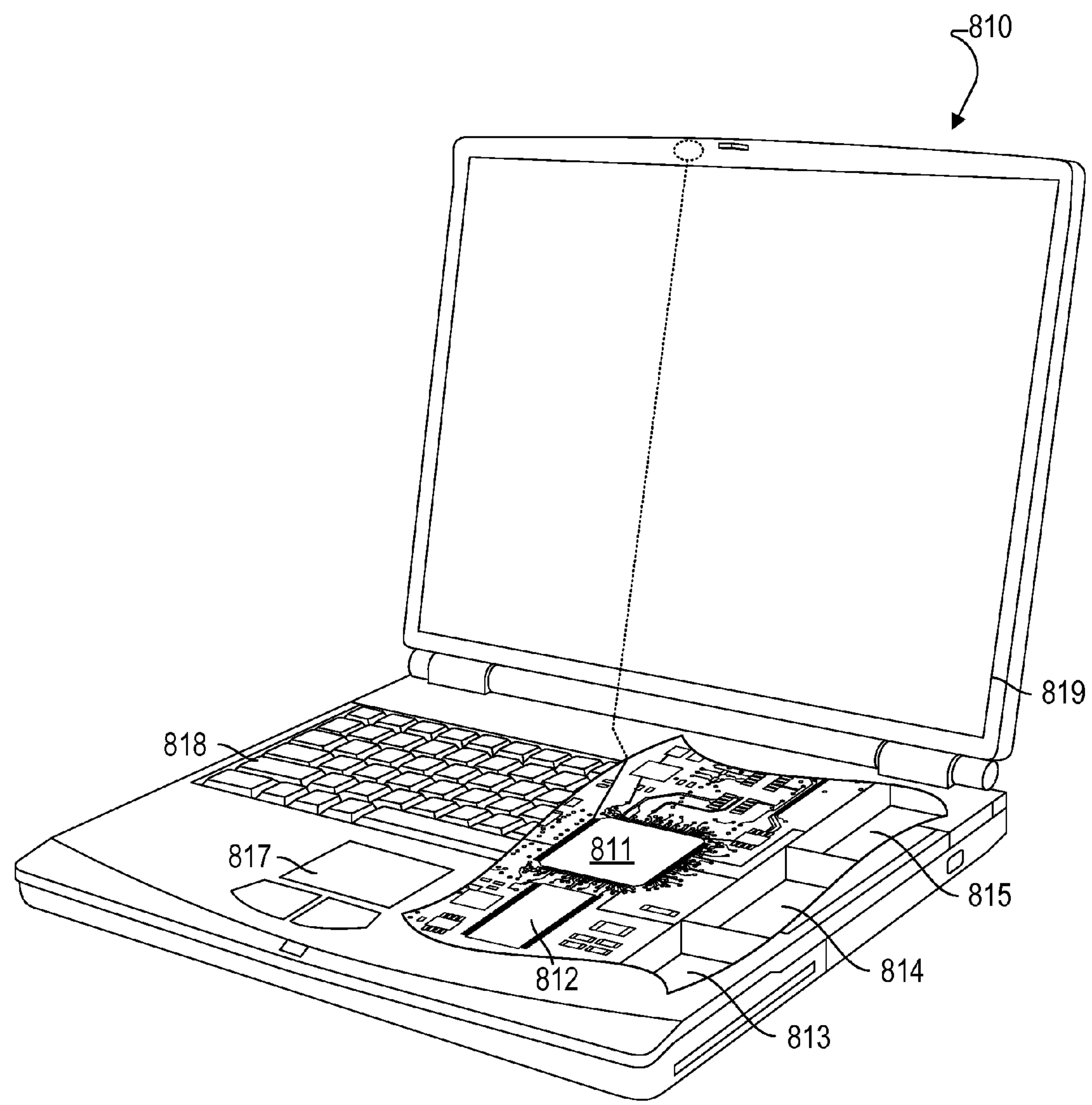
FIG. 8 is a component diagram of another example mobile device suitable for use with the various embodiments.

The various embodiments described above may also be implemented within a variety of personal computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity nonvolatile memory, such as a disk drive 813 of Flash memory. The computer 810 may also include a floppy disc drive 814 and a compact disc (CD) drive 815 coupled to the processor 811. The computer device 810 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

The processors 702 and 811 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 704, 710, 812 and 813 before they are accessed and loaded into the processors 702 and 811. The processors 702 and 81 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702 and 811 includes internal memory or removable memory plugged into the device and memory within the processor 702 and 811, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of autonomously mitigating receiver desense in a multiple subscriber identity module (multi-SIM) wireless device, comprising:

detecting potential interference between a scheduled transmission on a first radio frequency (RF) resource associated with a first subscriber identity module (SIM) and a receive activity on a second RF resource associated with a second SIM;

calculating a level of potential interference between the scheduled transmission and the receive activity;

predicting a level of desense of receive circuitry of the second RF resource based on the calculated level of potential interference;

determining whether the predicted desense level exceeds a predetermined threshold;

determining whether the receive activity comprises receiving a high priority downlink signal in response to determining that the predicted desense level exceeds the predetermined threshold;

selecting a mitigating action and performing the selected mitigating action in response to determining that the receive activity comprises receiving a high priority downlink signal; and in response to determining that the receive activity does not comprise receiving a high priority downlink signal:

determining whether the receive activity involves monitoring signal strength of nearby networks; and moving the receive activity to a different timeslot or frame in response to determining that the receive activity involves monitoring signal strength of nearby networks.

2. The method of claim 1, wherein detecting potential interference between the scheduled transmission on the first RF resource and the receive activity on the second RF resource is based on an overlap of sideband noise from the first RF resource and a passband of the receive circuitry of the second RF resource.

3. The method of claim 1, wherein the mitigating action is selected from a group comprising:

reducing transmit power;

cancelling a portion of interfering data in the scheduled transmission;

cancelling all interfering data in the scheduled transmission;

delaying the scheduled transmission; and handling the scheduled transmission.

4. The method of claim 3, wherein selecting a mitigating action comprises:

determining a characteristic of the scheduled transmission and a characteristic of the receive activity; and using a table look-up process in which the characteristic of the scheduled transmission and the characteristic of the receive activity are used as table look-up parameters, wherein the mitigating action is stored as an element with an address that corresponds to the characteristic of the scheduled transmission and the characteristic of the receive activity.

5. The method of claim 4, wherein the determined characteristic of the scheduled transmission comprises a channel on which the scheduled transmission is to be sent on the uplink.

6. The method of claim 4, wherein the determined characteristic of the receive activity comprises a channel on which data may be received on the downlink.

7. The method of claim 1, wherein selecting a mitigating action comprises:

determining whether the scheduled transmission is a message on a control channel;

determining whether the scheduled transmission can be delayed without negatively impacting service in response to determining that the scheduled transmission is not a message on a control channel;

determining whether reducing power of the scheduled transmission will cause the scheduled transmission to fail in response to determining that the scheduled transmission cannot be delayed without negatively impacting service;

determining whether cancelling part of the scheduled transmission will sufficiently reduce interference to the receive activity in response to determining that reducing power of the scheduled transmission will cause the scheduled transmission to fail; and cancelling all of the scheduled transmission in response to determining that cancelling part of the scheduled transmission will not sufficiently reduce interference.

8. The method of claim 7, further comprising:

determining whether control data on the scheduled transmission has been previously delayed in response to determining that the scheduled transmission is a message on a control channel;

determining a number of frames for delaying the scheduled transmission and saving the number of frames for delaying in response to determining that the message on the control channel has not been previously delayed; and delaying the scheduled transmission by the determined number of frames.

9. The method of claim 8, further comprising:

sending the scheduled transmission at the next available opportunity in response to determining that the message on the control channel has been previously delayed.

10. The method of claim 8, wherein the control channel is selected from a group comprising:

Fast Associated Control Channel (FACCH);

Slow Associated Control Channel (SACCH);

Standalone Dedicated Control Channel (SDCCH);

Packet Associated Control Channel (PACCH); and

Random Access Control Channel (RACH).

11. The method of claim 10, wherein the control channel is SACCH, and wherein selecting a mitigating action further comprises:

determining whether the receive activity comprises receiving a message on SACCH; and prioritizing between handling the scheduled transmission and handling the receive activity based on relative activity states of the first RF resource and the second RF resource in response to the receive activity comprising receiving a message on SACCH.

12. The method of claim 7, wherein the scheduled transmission comprises data on a Traffic Channel (TCH), and wherein selecting a mitigating action further comprises:

determining whether the receive activity comprises receiving data on a TCH; and prioritizing between handling the scheduled transmission and handling the receive activity based on relative activity states of the first RF resource and the second RF resource in response to determining that the receive activity comprises receiving data on a TCH.

13. The method of claim 7, further comprising:

delaying the scheduled transmission in response to determining that the scheduled transmission can be delayed without negatively impacting service.

14. The method of claim 7, further comprising:

reducing power of the scheduled transmission in response to determining that reducing power will not cause the scheduled transmission to fail.

15. The method of claim 7, further comprising:

cancelling part of the scheduled transmission in response to determining that cancelling part of the scheduled transmission will sufficiently reduce potential interference, wherein some but not all potentially interfering data of the scheduled transmission is sent on the uplink.

16. The method of claim 1, wherein receiving a high priority downlink signal comprises receiving a downlink signal that has at least one of a lower scheduling flexibility and a greater negative impact on service relative to the scheduled transmission.

17. The method of claim 1, wherein receiving a high priority downlink signal comprises:

receiving information on one of a Synchronization Channel (SCH), a Paging Channel (PCH), a Broadcast Control Channel (BCCH), and a Frequency Correction Channel (FCCH) if the scheduled transmission is on one of a Random Access Channel (RACH), a Traffic Channel (TCH), a Fast Associated Control Channel (FACCH), a Packet Data Channel (PDCH), and a Packet Associated Control Channel (PACCH); and receiving information on one of a Slow Associated Control Channel (SACCH) and a Standalone Dedicated Control Channel (SDCCH) if the scheduled transmission is on one of the RACH, TCH, FACCH, and PDCH.

18. The method of claim 1, wherein receive activity that does not comprise receiving a high priority downlink signal comprises:

receiving information on one of a Packet Data Channel (PDCH) and a Packet Associated Control Channel (PACCH) if the scheduled transmission is on one of a Random Access Channel (RACH), a Traffic Channel (TCH), a Fast Associated Control Channel (FACCH), a Slow Associated Control Channel (SACCH), a Standalone Dedicated Control Channel (SDCCH), and a Packet Data Channel (PDCH);

receiving a message for a T3192 timer if the scheduled transmission is on one of the RACH, TCH, FACCH, SACCH, SDCCH, and PDCH; and receiving information on one of the TCH and FACCH if the scheduled transmission is on one of the RACH, SACCH, SDCCH, and FACCH.

19. A multiple subscriber identity module (multi-SIM) wireless device, comprising:

a first radio frequency (RF) resource associated with a first SIM;

a second RF resource associated with a second SIM;

a processor coupled to the first RF resource and the second RF resource, wherein the processor is configured with processor-executable instructions to perform operations comprising:

detecting potential interference between a scheduled transmission on the first RF resource and a receive activity on the second RF resource;

calculating a level of potential interference between the scheduled transmission and the receive activity;

predicting a level of desense of receive circuitry of the second RF resource based on the calculated level of potential interference;

determining whether the predicted desense level exceeds a predetermined threshold;

determining whether the receive activity comprises receiving a high priority downlink signal in response to determining that the predicted desense level exceeds the predetermined threshold;

selecting a mitigating action and performing the selected mitigating action in response to determining that the receive activity comprises receiving a high priority downlink signal; and in response to determining that the receive activity does not comprise receiving a high priority downlink signal:

determining whether the receive activity involves monitoring signal strength of nearby networks; and moving the receive activity to a different timeslot or frame in response to determining that the receive activity involves monitoring signal strength of nearby networks.

20. The multi-SIM wireless device of claim 19, wherein the processor is configured with processor-executable instructions to perform operations such that:

detecting potential interference between the scheduled transmission on the first RF resource and the receive activity on the second RF resource is based on an overlap of sideband noise from the first RF resource and a passband of the receive circuitry of the second RF resource.

21. The multi-SIM wireless device of claim 19, wherein the processor is configured with processor-executable instructions to perform operations such that the mitigating action is selected from a group comprising:

reducing transmit power;

cancelling a portion of interfering data in the scheduled transmission;

cancelling all interfering data in the scheduled transmission;

delaying the scheduled transmission; and handling the scheduled transmission.

22. The multi-SIM wireless device of claim 21, wherein the processor is configured with processor-executable instructions to perform operations such that selecting a mitigating action further comprises:

determining a characteristic of the scheduled transmission and a characteristic of the receive activity; and using a table look-up process in which the characteristic of the scheduled transmission and the characteristic of the receive activity are used as table look-up parameters, wherein the mitigating action is stored as an element with an address that corresponds to the characteristic of the scheduled transmission and the characteristic of the receive activity.

23. The multi-SIM wireless device of claim 22, wherein the processor is configured with processor-executable instructions to perform operations such that the determined characteristic of the scheduled transmission comprises a channel on which the scheduled transmission is to be sent on the uplink.

24. The multi-SIM wireless device of claim 22, wherein the processor is configured with processor-executable instructions to perform operations such that the determined characteristic of the receive activity comprises a channel on which data may be received on the downlink.

25. The multi-SIM wireless device of claim 19, wherein the processor is configured with processor-executable instructions to perform operations such that selecting a mitigating action comprises:

determining whether the scheduled transmission is a message on a control channel;

determining whether the scheduled transmission can be delayed without negatively impacting service in response to determining that the scheduled transmission is not a message on a control channel;

determining whether reducing power of the scheduled transmission will cause the scheduled transmission to fail in response to determining that the scheduled transmission cannot be delayed without negatively impacting service;

determining whether cancelling part of the scheduled transmission will sufficiently reduce interference to the receive activity in response to determining that reducing power of the scheduled transmission will cause the scheduled transmission to fail; and cancelling all of the scheduled transmission in response to determining that cancelling part of the scheduled transmission will not sufficiently reduce interference.

26. The multi-SIM wireless device of claim 25, wherein the processor is configured with processor-executable instructions to perform operations further comprising:

determining whether control data on the scheduled transmission has been previously delayed in response to determining that the scheduled transmission is a message on a control channel;

determining a number of frames for delaying the scheduled transmission and saving the number of frames for delaying in response to determining that the message on the control channel has not been previously delayed; and delaying the scheduled transmission by the determined number of frames.

27. The multi-SIM wireless device of claim 26, wherein the processor is configured with processor-executable instructions to perform operations further comprising:

sending the scheduled transmission at the next available opportunity in response to determining that the message on the control channel has been previously delayed.

28. The multi-SIM wireless device of claim 26, wherein the processor is configured with processor-executable instructions to perform operations such that the control channel is selected from a group comprising:

Fast Associated Control Channel (FACCH);

Slow Associated Control Channel (SACCH);

Standalone Dedicated Control Channel (SDCCH);

Packet Associated Control Channel (PACCH); and

Random Access Control Channel (RACH).

29. The multi-SIM wireless device of claim 28, wherein the control channel is SACCH, and wherein the processor is configured with processor-executable instructions to perform operations such that selecting a mitigating action further comprises:

determining whether the receive activity comprises receiving a message on SACCH; and prioritizing between handling the scheduled transmission and handling the receive activity based on relative activity states of the first RF resource and the second RF resource in response to the receive activity comprising receiving a message on SACCH.

30. The multi-SIM wireless device of claim 25, wherein the processor is configured with processor-executable instructions to perform operations such that:

the scheduled transmission comprises data on a Traffic Channel (TCH); and selecting a mitigating action comprises:

determining whether the receive activity comprises receiving data on a TCH; and prioritizing between handling the scheduled transmission and handling the receive activity based on relative activity states of the first RF resource and the second RF resource in response to determining that the receive activity comprises receiving data on a TCH.

31. The multi-SIM wireless device of claim 25, wherein the processor is configured with processor-executable instructions to perform operations further comprising:

delaying the scheduled transmission in response to determining that the scheduled transmission can be delayed without negatively impacting service.

32. The multi-SIM wireless device of claim 25, wherein the processor is configured with processor-executable instructions to perform operations further comprising:

reducing power of the scheduled transmission in response to determining that reducing power will not cause the scheduled transmission to fail.

33. The multi-SIM wireless device of claim 25, wherein the processor is configured with processor-executable instructions to perform operations further comprising:

cancelling part of the scheduled transmission in response to determining that cancelling part of the scheduled transmission will sufficiently reduce potential interference, wherein some but not all potentially interfering data of the scheduled transmission is sent on the uplink.

34. A multiple subscriber identity module (multi-SIM) wireless device, comprising:

a first radio frequency (RF) resource associated with a first subscriber identity module (SIM);

a second RF resource associated with a second SIM;

means for detecting potential interference between a scheduled transmission on the first RF resource associated with the first SIM and a receive activity on the second RF resource associated with the second SIM;

means for calculating a level of potential interference between the scheduled transmission and the receive activity;

means for predicting a level of desense of receive circuitry of the second RF resource based on the calculated level of potential interference;

means for determining whether the predicted desense level exceeds a predetermined threshold;

means for determining whether the receive activity comprises receiving a high priority downlink signal in response to determining that the predicted desense level exceeds the predetermined threshold;

means for selecting a mitigating action and performing the selected mitigating action in response to determining that the receive activity comprises receiving a high priority downlink signal; and in response to determining that the receive activity does not comprise receiving a high priority downlink signal:

means for determining whether the receive activity involves monitoring signal strength of nearby networks; and receive activity; and means for moving the receive activity to a different timeslot or frame in response to determining that the receive activity involves monitoring signal strength of nearby networks.

35. The multi-SIM wireless device of claim 34, wherein means for detecting potential interference between the scheduled transmission on the first RF resource and the receive activity on the second RF resource is based on an overlap of sideband noise from the first RF resource and a passband of the receive circuitry of the second RF resource.

36. The multi-SIM wireless device of claim 34, wherein the mitigating action is selected from a group comprising:

reducing transmit power;

cancelling a portion of interfering data in the scheduled transmission;

cancelling all interfering data in the scheduled transmission;

delaying the scheduled transmission; and handling the scheduled transmission.

37. The multi-SIM wireless device of claim 36, wherein means for selecting a mitigating action comprises:

means for determining a characteristic of the scheduled transmission and a characteristic of the receive activity; and means for using a table look-up process in which the characteristic of the scheduled transmission and the characteristic of the receive activity are used as table look-up parameters, wherein the mitigating action is stored as an element with an address that corresponds to the characteristic of the scheduled transmission and the characteristic of the receive activity.

38. The multi-SIM wireless device of claim 37, wherein the determined characteristic of the scheduled transmission comprises a channel on which the scheduled transmission is to be sent on the uplink.

39. The multi-SIM wireless device of claim 37, wherein the determined characteristic of the receive activity comprises a channel on which data may be received on the downlink.

40. The multi-SIM wireless device of claim 34, wherein means for selecting a mitigating action comprises:

means for determining whether the scheduled transmission is a message on a control channel;

means for determining whether the scheduled transmission can be delayed without negatively impacting service in response to determining that the scheduled transmission is not a message on a control channel;

means for determining whether reducing power of the scheduled transmission will cause the scheduled transmission to fail in response to determining that the scheduled transmission cannot be delayed without negatively impacting service;

means for determining whether cancelling part of the scheduled transmission will sufficiently reduce interference to the receive activity in response to determining that reducing power of the scheduled transmission will cause the scheduled transmission to fail; and means for cancelling all of the scheduled transmission in response to determining that cancelling part of the scheduled transmission will not sufficiently reduce interference.

41. The multi-SIM device of claim 40, further comprising:

means for determining whether control data on the scheduled transmission has been previously delayed in response to determining that the scheduled transmission is a message on a control channel;

means for determining a number of frames for delaying the scheduled transmission and saving the number of frames for delaying in response to determining that the message on the control channel has not been previously delayed; and means for delaying the scheduled transmission by the determined number of frames.

42. The multi-SIM wireless device of claim 41, further comprising:

means for sending the scheduled transmission at the next available opportunity in response to determining that the message on the control channel has been previously delayed.

43. The multi-SIM wireless device of claim 41, wherein the control channel is selected from a group comprising:

Fast Associated Control Channel (FACCH);

Slow Associated Control Channel (SACCH);

Standalone Dedicated Control Channel (SDCCH);

Packet Associated Control Channel (PACCH); and

Random Access Control Channel (RACH).

44. The multi-SIM wireless device of claim 43, wherein the control channel is SACCH, and wherein means for selecting a mitigating action further comprises:

means for determining whether the receive activity comprises receiving a message on SACCH; and means for prioritizing between handling the scheduled transmission and handling the receive activity based on relative activity states of the first RF resource and the second RF resource in response to the receive activity comprising receiving a message on SACCH.

45. The multi-SIM wireless device of claim 40, wherein the scheduled transmission comprises data on a Traffic Channel (TCH), and wherein means for selecting a mitigating action further comprises:

means for determining whether the receive activity comprises receiving data on a TCH; and means for prioritizing between handling the scheduled transmission and handling the receive activity based on relative activity states of the first RF resource and the second RF resource in response to determining that the receive activity comprises receiving data on a TCH.

46. The multi-SIM wireless device of claim 40, further comprising:

means for delaying the scheduled transmission in response to determining that the scheduled transmission can be delayed without negatively impacting service.

47. The multi-SIM wireless device of claim 40, further comprising:

means for reducing power of the scheduled transmission in response to determining that reducing power will not cause the scheduled transmission to fail.

48. The multi-SIM wireless device of claim 40, further comprising:

means for cancelling part of the scheduled transmission in response to determining that cancelling part of the scheduled transmission will sufficiently reduce potential interference, wherein some but not all potentially interfering data of the scheduled transmission is sent on the uplink.

49. A non-transitory processor-readable storage medium having stored thereon processor-executable instructions configured to cause a multiple subscriber identity module (multi-SIM) wireless device processor to perform operations comprising:

detecting potential interference between a scheduled transmission on a first radio frequency (RF) resource associated with a first subscriber identity module (SIM) and a receive activity on a second RF resource associated with a second SIM;

calculating a level of potential interference between the scheduled transmission and the receive activity;

predicting a level of desense of receive circuitry of the second RF resource based on the calculated level of potential interference;

determining whether the predicted desense level exceeds a predetermined threshold;

determining whether the receive activity comprises receiving a high priority downlink signal in response to determining that the predicted desense level exceeds the predetermined threshold;

selecting a mitigating action and performing the selected mitigating action in response to determining that the receive activity comprises receiving a high priority downlink signal; and in response to determining that the receive activity does not comprise receiving a high priority downlink signal:

determining whether the receive activity involves monitoring signal strength of nearby networks; and moving the receive activity to a different timeslot or frame in response to determining that the receive activity involves monitoring signal strength of nearby networks.

50. The non-transitory processor-readable storage medium of claim 49, wherein the stored processor-executable instructions are configured to cause the multi-SIM wireless device processor to perform operations such that detecting potential interference between the scheduled transmission on the first RF resource and the receive activity on the second RF resource is based on an overlap of sideband noise from the first RF resource and a passband of the receive circuitry of the second RF resource.

51. The non-transitory processor-readable storage medium of claim 49, wherein the stored processor-executable instructions are configured to cause the multi-SIM wireless device processor to perform operations such that the mitigating action is selected from a group comprising:

reducing transmit power;

cancelling a portion of interfering data in the scheduled transmission;

cancelling all interfering data in the scheduled transmission;

delaying the scheduled transmission; and handling the scheduled transmission.

52. The non-transitory processor-readable storage medium of claim 51, wherein the stored processor-executable instructions are configured to cause the multi-SIM wireless device processor to perform operations such that selecting a mitigating action comprises:

determining a characteristic of the scheduled transmission and a characteristic of the receive activity; and using a table look-up process in which the characteristic of the scheduled transmission and the characteristic of the receive activity are used as table look-up parameters, wherein the mitigating action is stored as an element with an address that corresponds to the characteristic of the scheduled transmission and the characteristic of the receive activity.

53. The non-transitory processor-readable storage medium of claim 52, wherein the stored processor-executable instructions are configured to cause the multi-SIM wireless device processor to perform operations such that the determined characteristic of the scheduled transmission comprises a channel on which the scheduled transmission is to be sent on the uplink.

54. The non-transitory processor-readable storage medium of claim 52, wherein the stored processor-executable instructions are configured to cause the multi-SIM wireless device processor to perform operations such that the determined characteristic of the receive activity comprises a channel on which data may be received on the downlink.

55. The non-transitory processor-readable storage medium of claim 49, wherein the stored processor-executable instructions are configured to cause the multi-SIM wireless device processor to perform operations such that selecting a mitigating action comprises:

determining whether the scheduled transmission is a message on a control channel;

determining whether the scheduled transmission can be delayed without negatively impacting service in response to determining that the scheduled transmission is not a message on a control channel;

determining whether reducing power of the scheduled transmission will cause the scheduled transmission to fail in response to determining that the scheduled transmission cannot be delayed without negatively impacting service;

determining whether cancelling part of the scheduled transmission will sufficiently reduce interference to the receive activity in response to determining that reducing power of the scheduled transmission will cause the scheduled transmission to fail; and cancelling all of the scheduled transmission in response to determining that cancelling part of the scheduled transmission will not sufficiently reduce interference.

56. The non-transitory processor-readable storage medium of claim 55, wherein the stored processor-executable instructions are configured to cause the multi-SIM wireless device processor to perform operations further comprising:

determining whether control data on the scheduled transmission has been previously delayed in response to determining that the scheduled transmission is a message on a control channel;

determining a number of frames for delaying the scheduled transmission and saving the number of frames for delaying in response to determining that the message on the control channel has not been previously delayed; and delaying the scheduled transmission by the determined number of frames.

57. The non-transitory processor-readable storage medium of claim 56, wherein the stored processor-executable instructions are configured to cause the multi-SIM wireless device processor to perform operations further comprising:

sending the scheduled transmission at the next available opportunity in response to determining that the message on the control channel has been previously delayed.

58. The non-transitory processor-readable storage medium of claim 56, wherein the stored processor-executable instructions are configured to cause the multi-SIM wireless device processor to perform operations such that the control channel is selected from a group comprising:

Fast Associated Control Channel (FACCH);

Slow Associated Control Channel (SACCH);

Standalone Dedicated Control Channel (SDCCH);

Packet Associated Control Channel (PACCH); and

Random Access Control Channel (RACH).

59. The non-transitory processor-readable storage medium of claim 58, wherein the control channel is SACCH, and wherein the stored processor-executable instructions are configured to cause the multi-SIM wireless device processor to perform operations such that selecting a mitigating action further comprises:

determining whether the receive activity comprises receiving a message on SACCH; and prioritizing between handling the scheduled transmission and handling the receive activity based on relative activity states of the first RF resource and the second RF resource in response to the receive activity comprising receiving a message on SACCH.

60. The non-transitory processor-readable storage medium of claim 55, wherein the scheduled transmission comprises data on a Traffic Channel (TCH), and wherein the stored processor-executable instructions are configured to cause the multi-SIM wireless device processor to perform operations such that selecting a mitigating action further comprises:

determining whether the receive activity comprises receiving data on a TCH; and prioritizing between handling the scheduled transmission and handling the receive activity based on relative activity states of the first RF resource and the second RF resource in response to determining that the receive activity comprises receiving data on a TCH.

61. The non-transitory processor-readable storage medium of claim 55, wherein the stored processor-executable instructions are configured to cause the multi-SIM wireless device processor to perform operations further comprising:

delaying the scheduled transmission in response to determining that the scheduled transmission can be delayed without negatively impacting service.

62. The non-transitory processor-readable storage medium of claim 55, wherein the stored processor-executable instructions are configured to cause the multi-SIM wireless device processor to perform operations further comprising:

reducing power of the scheduled transmission in response to determining that reducing power will not cause the scheduled transmission to fail.

63. The non-transitory processor-readable storage medium of claim 55, wherein the stored processor-executable instructions are configured to cause the multi-SIM wireless device processor to perform operations further comprising:

cancelling part of the scheduled transmission in response to determining that cancelling part of the scheduled transmission will sufficiently reduce potential interference, wherein some but not all potentially interfering data of the scheduled transmission is sent on the uplink.

64. A method of autonomously mitigating receiver desense in a multi-SIM wireless device, comprising:

detecting potential interference between a scheduled transmission on a first radio frequency (RF) resource associated with a first subscriber identity module (SIM) and a receive activity on a second RF resource associated with a second SIM;

calculating a level of potential interference between the scheduled transmission and the receive activity;

predicting a level of desense of receive circuitry of the second RF resource based on the calculated level of potential interference;

determining whether the predicted desense level exceeds a predetermined threshold;

determining whether the receive activity comprises receiving a high priority downlink signal in response to determining that the predicted desense level exceeds the predetermined threshold; and in response to determining that the receive activity comprises receiving a high priority downlink signal:

determining whether the scheduled transmission is a message on a control channel;

determining whether the scheduled transmission can be delayed without negatively impacting service in response to determining that the scheduled transmission is not a message on a control channel; and selecting a mitigating action and performing the selected mitigating action in response to determining that the scheduled transmission cannot be delayed without negatively impacting service.

65. The method of claim 64, further comprising:

delaying the scheduled transmission in response to determining that the scheduled transmission can be delayed without negatively impacting service.

66. A multiple subscriber identity module (multi-SIM), wireless device, comprising:

a first radio frequency (RF) resource associated with a first subscriber identity module (SIM);

a second RF resource associated with a second SIM;

means for detecting potential interference between a scheduled transmission on the first RF resource and a receive activity on the second RF resource;

means for calculating a level of potential interference between the scheduled transmission and the receive activity;

means for predicting a level of desense of receive circuitry of the second RF resource based on the calculated level of potential interference;

means for determining whether the predicted desense level exceeds a predetermined threshold;

means for determining whether the receive activity comprises receiving a high priority downlink signal in response to determining that the predicted desense level exceeds the predetermined threshold; and in response to determining that the receive activity comprises receiving a high priority downlink signal:

means for determining whether the scheduled transmission is a message on a control channel;

means for determining whether the scheduled transmission can be delayed without negatively impacting service in response to determining that the scheduled transmission is not a message on a control channel; and means for selecting a mitigating action and performing the selected mitigating action in response to determining that the scheduled transmission cannot be delayed without negatively impacting service.

67. The multi-SIM wireless device of claim 66, further comprising:

means for delaying the scheduled transmission in response to determining that the scheduled transmission can be delayed without negatively impacting service.

* * * * *